US008361270B2

(12) United States Patent
Schmitt et al.

(10) Patent No.: US 8,361,270 B2
(45) Date of Patent: Jan. 29, 2013

(54) JOINING METHOD

(75) Inventors: Klaus-Gisbert Schmitt, Giessen (DE);
Andreas Becker, Alten-Buseck (DE);
Reinhold Opper, Buseck (DE); Michael Schmidt, Fernwald (DE); Reimar Saltenberger, Niederwetz (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/112,241

(22) Filed: May 20, 2011

(65) Prior Publication Data

US 2011/0277906 A1 Nov. 17, 2011

Related U.S. Application Data

(63) Continuation of application No. PCT/EP2009/008118, filed on Nov. 14, 2009.

(30) Foreign Application Priority Data

Nov. 21, 2008 (DE) .......................... 10 2008 059 242

(51) Int. Cl.
*B32B 37/00* (2006.01)
*B29C 65/00* (2006.01)

(52) U.S. Cl. ..................... 156/308.2; 156/64; 156/272.2

(58) Field of Classification Search .................... 156/64, 156/273.9, 274.2, 308.2, 309.6, 358, 378, 156/379.7, 272.2; 219/117.1, 633, 634
See application file for complete search history.

(56) References Cited

U.S. PATENT DOCUMENTS

| 4,128,449 | A | 12/1978 | Kobetsky |
| 5,414,247 | A | 5/1995 | Geithman et al. |
| 5,597,440 | A | 1/1997 | Pecha |
| 6,313,440 | B1 | 11/2001 | Weber et al. |
| 7,815,988 | B2 | 10/2010 | Stumpf et al. |
| 2001/0015056 | A1 | 8/2001 | Hiramoto et al. |
| 2004/0200808 | A1* | 10/2004 | Schmitt ............................ 219/98 |
| 2005/0155654 | A1* | 7/2005 | Vulkan et al. .................. 137/587 |
| 2006/0191909 | A1 | 8/2006 | Powell |
| 2007/0051730 | A1* | 3/2007 | Vorenkamp et al. .......... 220/562 |

FOREIGN PATENT DOCUMENTS

| DE | 3537670 A | * | 4/1987 |
| DE | 29722126 U | | 2/1998 |
| DE | 102006059337 A | | 6/2008 |
| DE | 202007004736 U | | 7/2008 |
| GB | 2408972 A | | 6/2005 |
| WO | 2005070718 A | | 8/2005 |

OTHER PUBLICATIONS

Machine translation of DE202007004736 date unknown.*
Machine translation of DE3537670 date unknown.*

* cited by examiner

*Primary Examiner* — John Goff
(74) *Attorney, Agent, or Firm* — Michael P. Leary

(57) ABSTRACT

The invention relates to a method for axial joining of a hybrid joining component to a workpiece, wherein the joining component has a thermoplastic joining section and a metal section which can be heated, having the following steps: moving the joining component into contact with a surface of the workpiece; heating of the metal section such that the joining section at least partially melts; ending the heating of the metal section such that the joining component makes a force-fitting, interlocking and/or integral connection with the surface of the workpiece. In this case, the joining component is held with a regulated force and/or in a regulated position with respect to the workpiece at least during the heating of the metal section, in such a manner that the joining component can be joined to the surface of the workpiece without any opposing support.

6 Claims, 7 Drawing Sheets

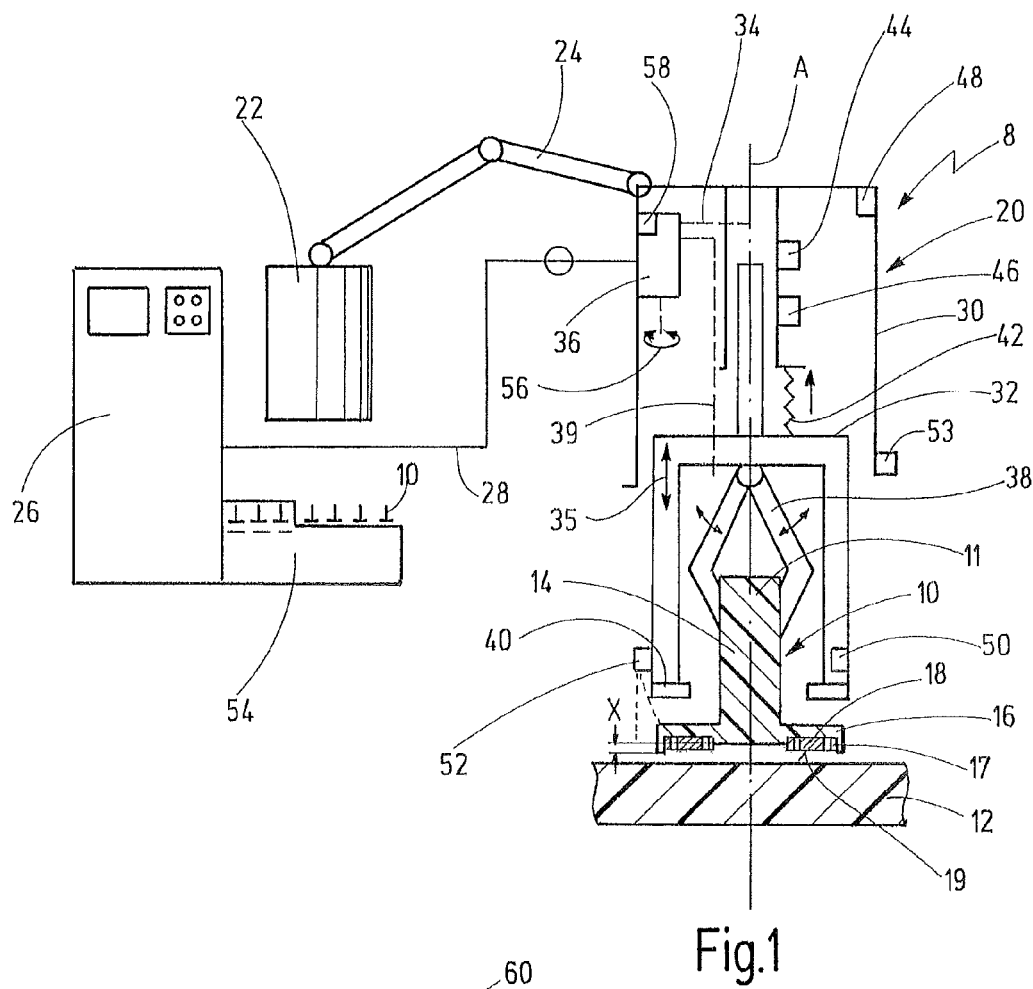
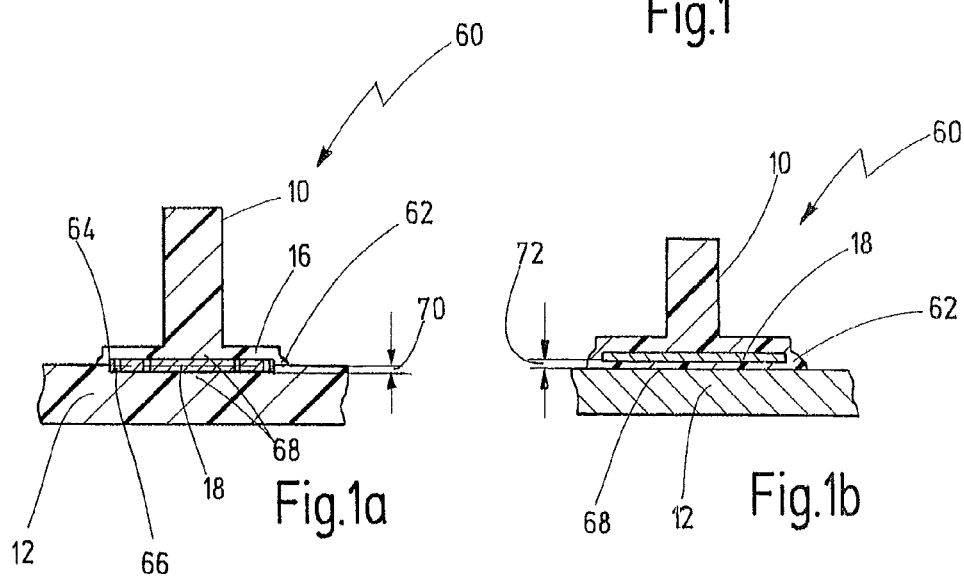
Fig.1
Fig.1a  Fig.1b

JOINING METHOD

CROSS-REFERENCE TO RELATED APPLICATIONS

This application is a continuation of PCT/EP2009/008118, filed Nov. 14, 2009 which claims priority from German Patent Application No. 10 2008 059 242.0, filed on Nov. 21, 2008, the disclosure of which is incorporated herein by reference.

BACKGROUND OF THE INVENTION

The present invention relates to a method for joining a joining component to a workpiece, and to a joining apparatus, in particular for carrying out a joining method as disclosed herein.

In general, the present invention relates to the field of joining of joining components, such as attachment elements, to workpieces such as bodywork components. In this case, an attachment element such as this generally has two functional sections, firstly a flange section by means of which the connection can be made to the workpiece. Secondly, the joining component in general has a holding section which, for example, may be in the form of an attachment shaft in order to fix further attachment elements, such as plastic clips, thereto.

Joining components such as these have been known for a long time as welding studs composed of metal, which are welded to workpieces such as metal bodywork sheets by means of so-called stud welding. This type of attachment has the advantage that a welding stud such as this can be welded onto the workpiece even when the latter is accessible from only one side.

It is also known for metal studs such as these to be adhesively bonded to a metal bodywork sheet. In this case, a joining surface of a flange section of the stud is provided with thermoplastic adhesive which can be activated by heating the stud, in order to form a force-fitting adhesive connection with the surface of the workpiece. An apparatus for stud adhesion is, for example, known from the document DE 10 2004 012 786 A1. In this case, the stud is held by means of a holding apparatus and is heated by means of an induction coil which is arranged coaxially with respect to a shank section of the bolt that is being held. Furthermore, a carriage which is provided on the joining apparatus can be moved towards the workpiece by means of a linear drive, in order to press the stud onto the workpiece. When the adhesive is activated and liquefied, an adhesive bead is formed around the outer rim of the flange section.

In a similar apparatus (U.S. Pat. No. 4,355,222), the stud is placed on the workpiece in advance, and is then pressed against the workpiece by means of a joining tool, while the adhesive is being activated.

Document DE 10 2006 059 337 A1 discloses a method for connection of parts composed of thermoplastic material wherein a joining component in the form of a holder is joined to a vehicle bumper bar composed of plastic. A connection element which has apertures, projections and/or depressions is arranged between the surfaces of the parts to be connected to one another. The connection element is designed to be heated when a varying magnetic field is applied. In consequence, the thermoplastic material of the surfaces is melted. When the molten material solidifies, this leads to a connection at least between the surfaces and the connection element, and thus to a connection between the parts via the connection element. The connection element can be joined onto one of the parts to be connected, in advance. Furthermore, the connection element is inductively heated via an induction heating device, which is arranged on the side of the workpiece opposite the joining component during the joining process.

BENEFITS OF THE INVENTION

Against the above background, the object of the invention is to specify a better joining method and a better joining apparatus.

This object is achieved on the one hand by a method for axial joining of a hybrid joining component to a workpiece, wherein the joining component has a thermoplastic joining section and a metal section which can be heated, having the following steps:

axially lowering the joining component onto a surface of the workpiece;

heating the metal section such that the joining section at least partially melts;

ending the heating of the metal section such that the joining component makes a force-fitting, interlocking and/or integral connection with the surface of the workpiece, wherein the joining component is held force-regulated and/or position-regulated with respect to the workpiece at least during the heating of the metal section, in such a manner that the joining component can be joined to the surface of the workpiece without any opposing support, wherein opposing support can be understood as meaning support on the rear side of the workpiece, behind the joining zone.

Furthermore, the above object is achieved by a joining apparatus which is particularly suitable for carrying out the joining method as mentioned above, having a joining tool on which a joining component can be held and which is designed to move the joining component in the axial direction onto a surface of a workpiece, and a heating device for heating a metal section of the joining component.

The method according to the invention makes it possible to join hybrid joining components to a workpiece, with access on only one side.

In general, the joining method according to the invention can be used for all types of hybrid joining components which have a thermoplastic joining section and a metal section which can be heated. For example, the joining component may have a base body composed of metal with a flange section to whose joining face a thermoplastic joining section is applied, such as an adhesive which can be activated thermally. Particularly preferably, however, the joining component has a base body composed of a thermoplastic material which in general defines a sleeve section and a flange section, wherein a metal section is integrated in the flange section.

A joining component such as this is described in the German patent application entitled "Joining component and method for production of a joining component" from the same applicant, and which was filed on the same date as the present patent application. Reference is made to incorporate the entire content of this parallel patent application into this application.

The workpiece may be any desired workpiece, for example a metal sheet, a glass plate or the like. However, the workpiece is particularly preferably a workpiece composed of a thermoplastic material.

In the present case, the expression axial lowering is intended to refer not only to a movement in the direction of the force of gravity downwards but to any desired movements towards the workpiece, that is to say also, for example, to movements in the opposite direction to the force of gravity towards a surface of the workpiece (overhead joining).

Furthermore, the workpiece may be designed such that it is elastically deformable in the axial direction. This should be understood as meaning on the one hand that the material of the workpiece itself is elastically deformable. However, in particular, this should be understood as meaning that the workpiece can be deflected elastically in the axial direction, because there is no opposing support.

A joint connection between the joining component and the workpiece can also be produced by a reliable process, by means of the force and position regulation of the joining component according to the invention, with respect to the workpiece, when the workpiece is deformed in the axial direction.

If the hybrid joining component is being joined to a thermoplastic workpiece, for example a plate composed of thermoplastic, the finished joint connection can be formed integrally at least in places, that is to say it may have a very high holding force. In this case, it is also possible to refer to this as a thermoplastic welding process.

In the method according to the invention, it is particularly preferable for the workpiece to be elastically deformable in the axial direction, wherein the joining component is lowered onto the surface of the workpiece before the metal section is heated, such that the workpiece is deformed in the axial direction.

On the one hand, this measure makes it possible to achieve a reliable contact between the joining section of the joining component and the surface of the workpiece. Furthermore, the capability of the workpiece to restore itself elastically during the joining method can contribute to the achievement of a "close" joint connection over a large area.

In this case, it is particularly preferable if a zero point is determined at the start of or in the course of the lowering to the surface, in order to determine the axial position of the surface of the workpiece in the undeformed state.

This determination of a zero point makes it possible to regulate the position of the joining component with respect to the zero-point surface of the workpiece. This makes it possible to improve the joint connection quality.

On the one hand, in this embodiment, it is possible to determine the zero point by means of a distance sensor which is arranged on a joining tool on which the joining component is held during the joining method.

By way of example, a distance sensor such as this may be a laser sensor or the like, by means of which the distance between the sensor and the zero point can be measured very accurately. However, the distance sensor may also be some other optical or electronic component by means of which the distance can be determined. In the simplest case, the distance sensor need not be able to measure different distances but only provides a zero-point signal when a joining surface of the joining component has reached the surface of the workpiece, before the latter is axially deformed.

However, it is particularly preferable if the zero point is determined by the variation of the force which is required for axial lowering of the joining component.

In this embodiment, a separate distance sensor is not absolutely essential. In fact, the zero point can be determined by determining the change in the force when the joining component touches the workpiece.

For this purpose, it may be advantageous to move the joining component towards the workpiece at a constant speed (in particular with speed regulation), in order to allow the force change to be detected easily.

In this embodiment, the force can be determined directly by means of force sensors which detect this force, for example a pressure-measurement box, a strain-gauge strip, etc. However, it is particularly preferable for the change in the force to be determined indirectly by means of the force of an actuator by means of which the joining component is lowered onto the workpiece. For example, the actuator may be a linear electric motor. In this case, the force may be proportional to the electric current by means of which the linear motor is controlled. However, indirect force detection can be carried out, for example, via the fluid pressure in the case of a fluid actuator. Furthermore, the actuator may be an electromagnetic actuator, in which case the force can once again be determined by means of the electric current.

Finally, it is also feasible for the joining component to be moved towards the workpiece by means of a mechanical spring. In this case, for example, the force can be calculated indirectly by means of the time profile of the deflection of the spring.

Furthermore, overall, it is preferable for the elasticity of the workpiece to be included in the determination of the zero point. The elasticity of the workpiece can be determined or programmed in advance, as a result of which there is no need for separate detection in the respective joining method.

According to a further preferred embodiment, the joining component is moved to a predetermined initial joining position, in which the workpiece is elastically deformed, before the metal section is heated.

In particular, the movement to the initial joining position can be carried out after the zero point has been determined, thus making it possible to use position regulation to adjust the predetermined initial joining position.

In this case, it is particularly preferable for the initial joining position to be located between the zero point and deformation of the workpiece while the zero point is determined.

In this embodiment, the zero point is determined in particular from the change in the force which results when the joining component touches the workpiece. In this case, the workpiece has generally already been relatively severely elastically deformed as well, in order to allow the joining component to be lowered onto the workpiece at a relatively high speed. After this, and before the metal section is heated, the joining component is then moved to an axial initial joining position, in which a joining surface of the joining component is located somewhat below the zero point, that is to say in particular is moved back with respect to the deformation of the workpiece when determining the zero point.

Overall, it is preferable for the relative position between the joining component and the workpiece to be regulated at a target position at least during a section of the heating of the metal section.

While the metal section is being heated, the thermoplastic material of the joining section melts and, as a result of the fact that the joining component and the workpiece are pressed against one another, is displaced such that the relative position between the joining component and the workpiece can change when the metal section is being heated.

In the case of a rigid workpiece, which cannot be deformed, the thermoplastic material may in this case be forced out at the side in order to form a bead. In this case, the joining component is moved further towards the workpiece during this process, because of a contact force.

If the workpiece can be deformed axially, at least a part of the contact force can be exerted by the elastic restoring force of the workpiece.

If the workpiece is produced from a thermoplastic material, a surface section of the workpiece will also melt when the metal section is heated. In this case thermoplastic material can flow into cavities that have not already been filled in the area of the flange section, or can be forced out at the side.

When a hybrid joining component is being joined to a thermoplastic workpiece, it is also preferable for a certain amount of penetration to be achieved in the finished joint connection, with the original joining surface of the joining section in the finished joint connection in consequence being located under the surface of the workpiece (that is to say below the zero point). This results in a particularly close joint connection.

In this embodiment, the relative position between the joining component and the workpiece is preferably subject to position regulation such that a predefined penetration is achieved.

However, position regulation such as this may also be advantageous in the case of rigid workpieces, which are not composed of thermoplastic material.

According to a further preferred embodiment, the relative position between the joining component and the workpiece is set by regulation to a target force, with which the joining component is pressed onto the workpiece, at least during a section of the heating of the metal section.

In this embodiment, the relative position is set by force regulation in such a way that it is possible to compensate well for varying constraints (varying material characteristics, etc.).

In this case, it is particularly preferable if the force regulation is converted to position regulation when the relative position between the joining component and the workpiece reaches a preset maximum relative position.

In this embodiment, the relative position between the joining component and the workpiece is also measured continually during the force regulation process. When a preset maximum relative position is reached, a changeover is made to position regulation. This makes it possible to prevent the joining component from being forced through to an opposite surface of the workpiece. Furthermore, this allows more consistent joining results to be achieved.

Where the text further above refers to a target position or a target force, this may relate to fixed preset variables. However, it may in this case also relate to predetermined position or force profiles.

Overall, it is preferable if the workpiece is produced from a thermoplastic material, and if the metal section is heated such that the joining section of the joining component and a surface section of the workpiece are melted, as has already been referred to above as thermoplastic welding.

Overall, it is also preferable if the joining component has a thermoplastic base body with a flange section in which the metal element is integrated, wherein the joining method is carried out such that the metal element is completely surrounded by thermoplastic material in the finished joint connection.

This measure makes it possible to encapsulate the metal element from the surrounding atmosphere. In particular, this makes it possible to avoid corrosion problems in the finished joint connection.

According to a further embodiment, which is preferred overall, the joining component has a thermoplastic base body with a flange section in which the metal element is integrated, such that the metal section is surrounded by a rim of the flange section, with the joining method being carried out such that the rim is melted.

The melting of the rim can contribute to the metal element being completely surrounded in the finished joint connection.

On the other hand, the melting of the rim can also contribute to achieving an interlocking connection between the metal element and the thermoplastic material in the radial direction.

Furthermore, it is preferable overall if the temperature of the joint zone is measured at least during the heating of the metal section, and the temperature measured in this way is included in the control of the joining method.

This makes it simpler to adjust the method for varying constraints.

Overall, it is also preferable if the shape of a bead which is formed in the rim area of the joint zone and is composed of thermoplastic material is monitored, and the shape measured in this way is included in the control of the joining method.

In this case, the respectively measured shape may, for example, be categorized in the course of pattern recognition and may be compared with previously stored patterns.

This allows the development of the bead shape to be observed, and to be included in the control of the joining method.

Alternatively, it is possible to use the detection of the shape of the bead for process monitoring, in order to check a joint connection after completion of a joint connection to determine whether the joint connection has been produced correctly.

In the case of the joining apparatus according to the invention, it is particularly advantageous if the heating device has an induction heating device with a coil and a ferrite core, wherein the ferrite core has a sleeve section, and wherein the joining component can be held on the joining tool such that a holding section of the joining component is surrounded by the sleeve section.

In this embodiment, the operation of the heating device can be designed to be efficient. Furthermore, the heating device can easily physically be combined with the holding device.

This is particularly true if the sleeve section is advantageously connected to a vacuum holding device which is designed to exert a vacuum holding force on the holding section of the joining component.

In this embodiment, it is particularly advantageous that the holding device need not have any disturbing metal parts in the area of the induction heating device. In fact, the joining component can be held by a vacuum.

It is also advantageous if the joining tool has an associated temperature sensor which is designed to measure the temperature of the joint zone.

This allows the quality of the joining method carried out using the joining apparatus to be improved.

In this case, it is particularly advantageous for the temperature sensor to be arranged on the sleeve section.

By way of example, the sleeve section may have a hole axially through it, via which a temperature sensor is moved into the vicinity of the joint zone. In this case, the sensor can preferably be formed from non-metallic materials, for example from a glass fibre for carrying heat rays, in such a way that the induction field to be exerted on the metal section is not interfered with, or is not significantly interfered with.

According to a further preferred embodiment, the heating device and a holding device for holding the joining component are arranged on a carriage which can be moved by means of a linear drive with respect to a housing of the joining tool.

In this embodiment, the step of lowering the joining component onto the workpiece can be carried out by means of the carriage. The carriage can also be quickly moved away from the joint zone again, as soon as the joint connection has been completed. Finally, it is possible to use the carriage to pick up a new joining component for a further joining process.

It is particularly preferable for the joining apparatus to have a position sensor for detection of the position of the carriage.

In this embodiment, position regulation can be carried out in particular before and during the heating of the metal section. Furthermore, the position sensor can be used to determine the zero point, with this process being carried out without any additional sensors, indirectly by means of the force which an actuator applies to the carriage.

According to a further preferred embodiment, the joining apparatus has a force sensor for detection of the force with which the joining component is pressed onto the workpiece.

The force sensor may be a separate sensor such as a pressure measurement box or the like. However, the force sensor may also be a sensor which measures a manipulated variable of an actuator, for example the current of a linear motor.

It is also preferable for the joining apparatus to have an orientation sensor for detection of the orientation of the joining tool in space.

This makes it possible to carry out force regulation taking account of the force of gravity since it is also possible for the force regulation process to include a factor relating to whether the joining tool is aligned downwards or upwards ("overhead").

Furthermore, it is preferable for the joining tool to have a rotary actuator by means of which the joining component can be aligned in a predetermined rotation position around the longitudinal axis before or during the movement to the workpiece.

This measure makes it possible to rotate a joining component, which has a flange section which is not flat but is matched to a curved workpiece surface, before placing it on the workpiece, in order to achieve a correct relative orientation in the rotation direction with respect to the workpiece.

Overall, it is also advantageous for the joining tool and/or the heating device to have a store for an identification code which can be transmitted to a superordinate control unit.

The store is preferably of an electronic nature and makes it possible to assign the joining tool and/or the heating device operating parameters which can be stored for the specific identification code, for example in the superordinate control unit. Alternatively, of course, it is also possible to store these operating parameters directly in the store, which can then be read by the superordinate control unit.

By way of example, the load capacity in terms of temperature may be used as an operating parameter. By way of example, different temperature load capacities may be provided for different types of joining tools and heating devices. The drive can be defined as a function thereof in the superordinate control unit such that the joining tool and the heating device are not overloaded in terms of temperature. By way of example, when an alternating current is provided for the joining tool by the control unit, this can be done by limiting the pulse width. Alternatively, the magnitude of a voltage which is provided for the joining tool can also be limited on a type-dependent basis.

In general, the joining method according to the invention and the joining tool according to the invention achieve at least one of the following advantages:

Thermoplastic joining components can be joined to workpieces which are accessible on only one side, without any need for an opposing support.

The method can be carried out taking into consideration the shape of the joining component, in such a manner that an interlocking, force-fitting and/or integral connection is produced between the thermoplastic components of the same type or of a different type and an integrated metal section.

A ferrite core of an induction heating device may be purely in the form of a sleeve, but may also be in the form of a U-core with a rectangular cross section, or an E-core with a rectangular or round cross section.

A coil for an induction heating device such as this may have from 1 up to a maximum of 100 turns.

Furthermore, the induction heating device can be equipped with a temperature sensor system in order to detect the temperature of the coil. The coil can be cooled by means of a cooling medium, such as cooling air, on this basis.

The joint zone temperature can be measured indirectly via the temperature of a joining flange of the joining component, to be precise for example by means of a glass-fibre line on the upper face of the flange section, opposite the joint zone.

Pneumatic actuating elements for producing reduced pressure can be integrated in the joining tool, and can be used to pick up and hold the joining component and/or to provide cooling air and/or for pneumatically operated carriage movement. The pneumatic actuating elements can be connected to a sensor system for pressure and/or reduced-pressure measurement, in order to make it possible to identify the presence of the compressed air in the joining tool and/or the presence of a joining component in the holding device.

Subordinate control electronics can be provided in the joining tool, in order to carry out drive actions, to transmit measurement and characteristic data to a superordinate control unit, and/or to receive control data from a superordinate control unit, for example via serial data transmission.

The joining tool can be connected via a hybrid line to a superordinate control unit, with the hybrid line containing, for example, lines for transmission of power (for operation of the heating device), data lines and/or pneumatic lines for a compressed-air or reduced-pressure supply.

The induction heating devices and holding devices can be designed to be geometrically and electrically the same for the area of the magnetic coupling between the induction heating device and the joining component, for manual and for automatic joining of joining components to workpieces, in order to make it possible to work with the same joining parameters, on a position-related basis.

In the case of thin workpieces, it is preferable for the force and/or position regulation during the heating of the metal section to be carried out such that no visible or traceable deformation occurs on the rear face of the workpiece.

In the case of an automatic joining tool, joining components can be picked up individually before each joining process, for example from a supply station.

It is furthermore also possible for the automated joining tool to transfer a predetermined number of joining components (for example in a magazine) in each case. A number of joining processes can then be carried out until the magazine is empty and the magazine needs to be replaced.

Particularly when the attachment elements have a thermoplastic base body, the attachment elements can be held or linked to one another in a belted form in the magazine, with separation being carried out in the joining tool.

In general, it is also feasible for joining components to be separated in a supply station and to be supplied individually in each case by means of a flexible supply tube to the joining tool, before a joining process.

Furthermore, the joining method can be monitored by storing data from sensors and other joining parameters. Furthermore, the respective penetration when joining to thermoplastic workpieces can be measured, and can have an envelope curve superimposed on it.

The penetration can be determined even before the joining tool is pulled off the finished joint connection.

Furthermore the temperature profiles of the joining processes can be measured with respect to each joint position and can have corresponding envelope curves superimposed on them, in order to issue a maintenance indication or the like in the event of discrepancies from the envelope curve.

In general, joint connections in which envelope curves are overshot or undershot can be characterized as being suspicious, and maintenance measures can be initiated if joining processes such as these occur with a defined frequency.

The measurement results of the zero point and the penetration achieved may be subject to a maximum permissible tolerance, with the respective joining process being terminated if the tolerance is overshot or undershot, or being identified as a suspicious joining process.

The joining forces by means of which the joining component is pressed onto the workpiece may be in the range from 1 to 100 N.

The position of the carriage can be detected by optical sensors ("encoders") or magnetoresistive position sensors. The speed and acceleration of the carriage can be derived from the position detection (for example in the control device which is provided in the joining tool).

The force by means of which the joining component is pressed onto the workpiece can be detected directly via a force sensor (for example a force measurement box) or indirectly via an actuator manipulated variable, such as the electric current for a linear motor.

Instead of a separate sensor for detection of the orientation of the joining tool in three dimensions, this orientation can also be calculated from the results of the force measurement.

It is self-evident that the features mentioned above and those which are still to be explained in the following text can be used not only in the respectively stated combination but also in other combinations or on their own without departing from the scope of the present invention.

BRIEF DESCRIPTION OF THE DRAWINGS

Exemplary embodiments of the invention will be explained in more detail in the following description, and are illustrated in the drawing, in which:

FIG. 1 shows a schematic illustration of a joining apparatus according to the invention, for joining a joining component to a workpiece;

FIG. 1a shows a finished joint connection to a thermoplastic workpiece;

FIG. 1b shows a finished joint connection to a workpiece composed of material which cannot be melted, such as metal;

DETAILED DESCRIPTION OF THE PREFERRED EMBODIMENTS

Figure 2:
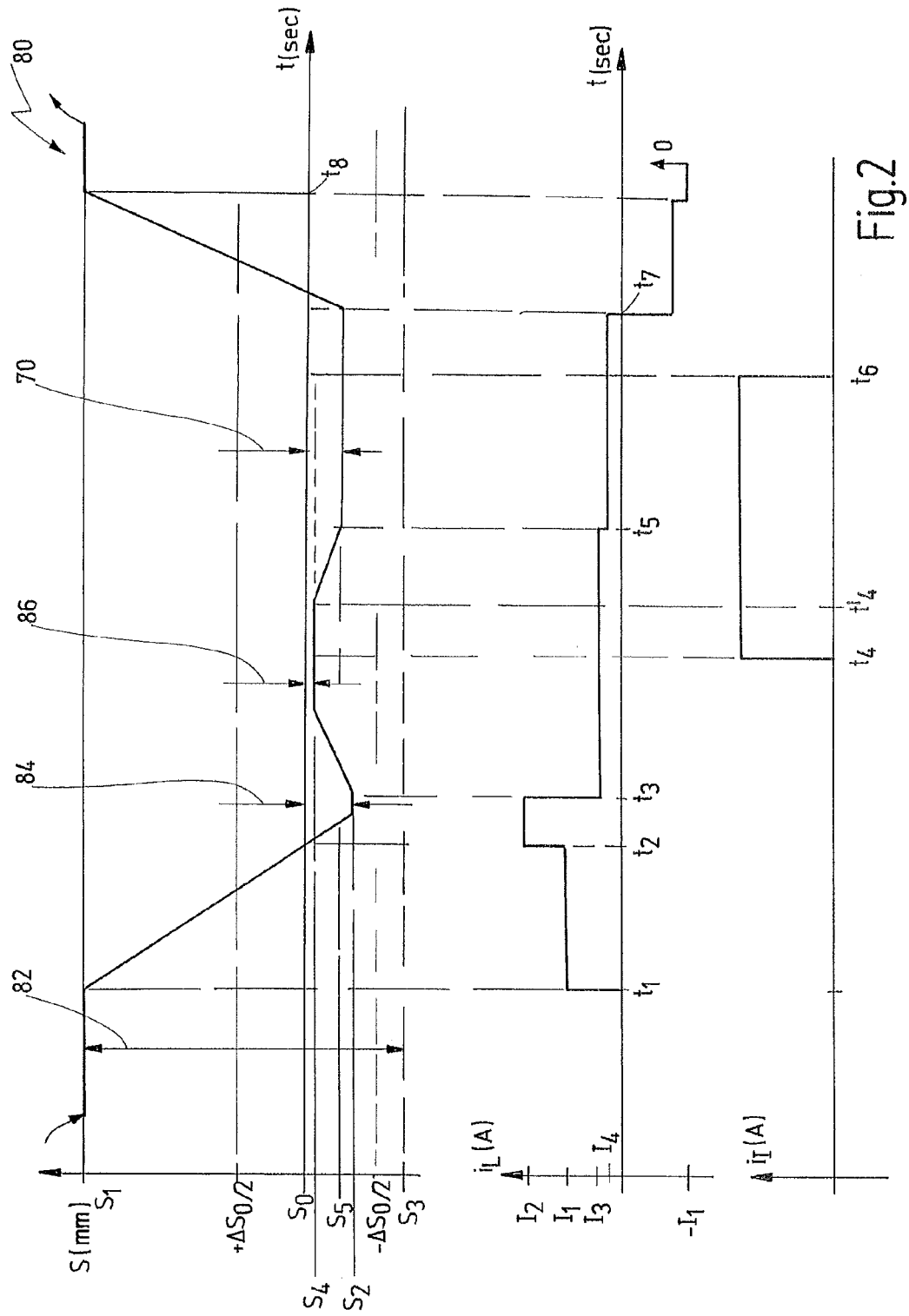
FIG. 2 shows schematic diagrams of the axial movement of a carriage, of the current of a linear motor for moving the carriage, and of the current for activation of an induction heating device, plotted against time, in order to illustrate a joining method according to the invention.

In FIG. 1, a first embodiment of a joining apparatus according to the invention is annotated 8 in general.

The joining apparatus 8 is used to carry out a joining process in which a hybrid joining component 10 is joined to a workpiece 12.

The joining component 10 has a base body 11 which may be composed of metal, but is preferably produced from a thermoplastic material. The base body 11 has a holding section 14 by means of which the joining component 10 can be held, as well as a flange section 16, by means of which the joining component 10 can be joined to a surface of the workpiece 12.

In the illustrated embodiment with a thermoplastic base body, a metal section 18 in the form of a flat metal element which is provided with apertures is integrated in the flange section 16. The metal section 18 together with a rim 17 of the flange section 16 forms a joining surface 19.

Alternatively, if the base body 11 is made from metal, a thermoplastic adhesive can be applied to the lower face of the flange section 16.

The rest of the description is based in general on a joining component 10 having a thermoplastic base body 11 in whose flange section 16 a metal section 18 is integrated. However, the corresponding description can also be applied in the same way to a joining component 10 whose base body 11 is produced from metal.

The joining apparatus 8 has a joining tool 20 which, in the illustrated example, is in the form of a joining head, which is mounted on an arm 24 of a robot 22.

The joining apparatus 8 furthermore has an apparatus 26 for supplying power and for controlling and which, for example, can be arranged in a stationary manner alongside the robot 22. In the following text, this apparatus 26 is referred to in general as the control unit 26.

The control unit 26 is connected to the joining tool 20 by means of a preferably flexible hybrid connecting line 28. The hybrid connection 28 may, for example, be equipped with lines for supplying power, control lines and/or pneumatic lines for supplying the joining tool 20 with compressed air or reduced pressure.

Alternatively, the joining tool 20 may also be a manually operable joining tool. In this case, suitable means for manual handling are provided on the joining tool 20.

The joining tool 20 has a joining head housing 30 on which a carriage 32 is mounted such that it can move in the axial direction A. The carriage 32 can be moved axially by means of a schematically indicated linear drive 34, for example a linear electric motor or a pneumatic drive, as is indicated by an arrow 35.

The joining tool 20 furthermore contains a subordinate control device 36, which receives control signals from the control unit 26 and sends process monitoring signals to the control unit 26.

Furthermore, the joining tool 20 contains a holding device 38 for holding the holding section 14 of the joining component 10, and this holding device 38 can be operated by means of a schematically indicated actuator 39.

The holding device 38 is indicated schematically in FIG. 1 as a mechanical holding device, but it is preferably a vacuum holding device which can fix the joining component 10 to the carriage 32 by application of a vacuum.

Furthermore, a heating device 40 is provided on the carriage 32 and is designed to heat the metal section 18 (or the base body itself in the case of a metallic base body), in order in this way to melt a meltable joining section of the flange section 16 and/or the surface of the workpiece 12.

The carriage 32 is pre-stressed into the joining head housing 30 by means of a spring 42. The linear drive 34 in consequence moves the carriage 32 out of the joining head housing 30 against the force of the spring 42.

The joining tool 20 is also equipped with a position sensor 44 for detection of the position of the carriage 32 (and thus the position of a joining component 10 held on it). The joining tool 20 furthermore contains a force sensor 46 by means of which it is possible to determine the force with which the joining component 10 is pressed against the workpiece 12.

Finally, the joining tool 20 preferably contains an orientation sensor 48 for detection of the spatial orientation of the joining tool 20, as well as a temperature sensor 50 for detection of the temperature of the joint zone. The temperature of the joint zone can also be measured indirectly, for example by measuring the temperature on the upper face of the flange section 16.

Finally, the joining tool 20 may have a bead shape sensor 52, by means of which the shape of a bead, which results during a joining process, on the rim of the flange section can be detected optically. The shape of the bead can be compared with previously stored reference shapes of the bead in order in this way to provide process monitoring.

As will explained in the following text, the relative distance between the joining tool 20 and the surface of the workpiece 12 during the joining process is important. For this purpose a distance sensor 53 can be provided on the joining tool 20 in order to measure this distance. The distance sensor 53 may be arranged on the joining head housing 30 or on the carriage 32.

The joining apparatus 8 furthermore contains a component supply station 54 at which joining components 10 are provided which have each already been separated and which can be picked up by operation of the robot 22 and of the carriage 32 into the joining tool 20, in order to initiate a joining process.

In general, the flange section 16 of the joining component 10 is designed to be flat, preferably as a circular flange section. However, the flange section 16 may also be designed such that it is not flat, particularly when the surface of the workpiece 12 is not flat at the point to which the joining component 10 is to be joined. In order to ensure in this case that the joining component 10 is positioned in the correct orientation about the longitudinal axis A, the joining tool 20 may furthermore have a rotary actuator 56 in order to rotate the joining component 10 about the longitudinal axis A with respect to the joining head housing 30.

Furthermore, a store 58 for an identification code is provided in the joining tool. The identification code identifies the joining tool 20, for example a specific type of joining tool and/or each individual joining tool. Alternatively or additionally, a store 58 such as this can also be provided on the carriage 32 in order, for example, to identify the type or each individual heating device 40.

The control unit 26 is designed to read the identification code, which can also be done automatically, for example on changing the joining head 20 on the robot 22.

Specific operating parameters of the respective joining tool 20 (of the respective heating device 40), for example the temperature load capacity, may then be deduced in the control unit 26 by means of the identification code. This allows limits for the setting parameters to be defined in the control unit 26 in such a way that no damaging operating mode (in particular no damaging heating) can occur during operation. By way of example, the limiting can be carried out by influencing the power supply to the joining tool 20. In the case of a pulsed electrical power source, for example, the pulse width can be limited. Alternatively, it is possible to reduce the magnitude of the input DC voltage from which the pulsed electrical power supply for the joining tool 20 is derived.

FIGS. 1*a* and 1*b* show finished joint connections 60, which have been produced by means of the joining apparatus shown in FIG. 1.

FIG. 1*a* shows a joining component 10 having a thermoplastic base body 11 which, as shown in the illustration in FIG. 1, has a flange section 16 on whose lower face a metal section 18 is integrated.

Furthermore, in the case of the finished joint connection 60 in FIG. 1*a*, the workpiece 12 is composed of a thermoplastic material. As can be seen, on the one hand, a bead 62 surrounding the metal section 18 results on the external circumference of the flange section 16 in the finished joint connection 60. To be more precise, the metal section 18 in the joint connection 60 is completely enclosed by thermoplastic material of the flange section 16, of the bead 62 and of the workpiece 12, thus avoiding corrosion problems.

The metal section 18 has a plurality of axial through-holes through which melts of the flange section 16 and of the workpiece 12 can be connected, to be precise to form an integral connection 66. An interlocking connection 64 is furthermore achieved in the radial direction in this way and by inclusion of the metal section 18. The metal section 18 is in each case connected to the adjacent thermoplastic material via a force fit 68 on the upper face and the lower face of the metal section 18.

As can also be seen in FIG. 1*a*, the joining component 10 in the finished joint connection 60 has penetrated by an axial amount into the surface of the workpiece 12. In the present case, this amount is referred to as the "penetration" 70.

FIG. 1*b* shows an alternative embodiment of a finished joint connection 60. In this case, the joining component 10 is likewise equipped with a base body 11 composed of a thermoplastic material in which case, however, the workpiece 12 cannot be melted and, for example, is composed of metal or glass or a similar material. In this case, thermoplastic material is provided over the entire lower face of the metal section 18 such that a force-fitting connection 68 is produced between the joining section formed in this way of the joining component 10 and the surface of the workpiece 12. In this case as well, the joining section is heated and melted by means of the metal section 18 and a certain amount of pressure is exerted on the joining component 10 during the joining process, such that molten thermoplastic material escapes to the side and forms a bead 62, in such a way that the metal section 18 is also in this case completely surrounded by thermoplastic material. In general, for this purpose, it is necessary for a certain residual thickness 72 of thermoplastic material to remain between the metal section 18 and the surface of the workpiece 12.

Furthermore, in the embodiment in FIG. 1*b*, it is also possible to produce the base body 11 from a metal, for example integrally with the metal section 18.

Furthermore, in the embodiment shown in FIG. 1*a*, it is also possible to provide a joining component 10 with a base body 11 composed of metal, on whose lower face a thermoplastic material is provided, which is melted and is mixed with a melt of the workpiece 12, thus making it possible to achieve an integral connection.

FIG. 2 shows the procedure for a joining process 80, to be precise for the case of a hybrid joining component 10 with a thermoplastic base body 11, with the joining component 10 being joined to a workpiece 12, composed of thermoplastic material. Furthermore, in this embodiment, the workpiece 12 is elastically deformable in the axial direction, that is to say it is in the form, for example, of a relatively thin plastic panel composed of thermoplastic material which, overall, can be deflected in the axial direction when a pressure is exerted.

The upper illustration in FIG. 2 shows the position s of the carriage 32 plotted against time. The central illustrations shows the current $i_L$ for the linear drive 34 plotted against time t. A lower illustration shows the electric current $i_I$ for the induction heating device 40.

The joining method initially starts from a state in which the carriage 32 has been moved back completely into the joining head housing 30, and a joining component 10 is held on the holding device 38. This position of the carriage 32 is annotated $s_1$ in FIG. 2. At a time $t_1$, the linear drive 34 is supplied with current $i_L$, to be precise with a first value $I_1$. This results in the carriage 32 being moved out of the joining head housing 30 against the force of the spring 42, to be precise towards the workpiece 12. In this case, the carriage 32 preferably travels at a constant speed, thus resulting in a linear movement profile.

The surface of the workpiece 12 in the undeformed state is annotated $s_0$ in FIG. 2. At a time $t_2$, the joining surface 19 of the joining component 10 touches the surface of the workpiece 12. In consequence, the linear drive 34 requires a higher current, because of the speed regulation, and this is indicated schematically by $I_2$ in FIG. 2. During this process, the workpiece 12 is deflected axially, to be precise up to a maximum deflection 84. The zero point $s_0$ can be determined by detection of the change in the current from $I_1$ to $I_2$ and simultaneous detection of the position of the carriage 32, such that the magnitude of the maximum deflection 84, which is annotated $s_2$ in FIG. 2, is then also known.

Once the zero point $s_0$ has been determined in this way, the current $i_L$ of the linear drive 34 is reduced to a value $I_3$. This value is sufficiently low that the workpiece 12 is moved back elastically until an initial joining position $s_4$ results, which is preferably provided by position regulation. In this position, the joining surface 19 is still located below the zero point $S_0$, so that the workpiece 12 is still deflected by a small amount. This initial joining deflection or bending is annotated 86 in FIG. 2.

The current $i_I$ for the induction heating device 40 is then switched on at the time $t_4$. This current heats the metal section 18 such that adjacent sections of the flange section 16 and adjacent sections of the surface of the workpiece 12 are melted. A changeover is preferably made from position regulation to force regulation at a time $t_4'$ (see FIG. 4).

As soon as the sections have been melted, the melts start to penetrate into any cavities and/or to escape laterally, and form an integral connection. In consequence, if the linear drive current $I_3$ remains the same, the carriage 32 is moved further towards the workpiece 12. In the present embodiment, this is achieved by force regulation or by position regulation. At the time $t_5$, a pre-programmed penetration 70 has therefore occurred (the position of the carriage 32 is in this case $s_5$). As progress continues, the position of the carriage 32 is regulated and is kept constant at the pre-programmed penetration 70. Furthermore, at the time $t_5$, the current in the linear drive 34 can generally also be reduced further, to a value $I_4$, which in the present case is shown as a constant current. However, the value of the current may also vary in this area, because of the position regulation.

At the time $t_6$, the induction heating device 40 is switched off. A waiting time is then allowed to pass until the time $t_7$, during which the entire melt solidifies. At this time the linear drive 34 is switched over to backward movement, thus resulting in a negative current $-I_1$ and the carriage 32 moving away from the workpiece 12. It is self-evident that the holding device 38 must be released before this. At the time $t_8$, the carriage 32 has once again reached its basic position in the joining head housing 30, as a result of which the magnitude of the current increases once again. The current is then switched off, and the joining process is complete. By way of example, this results in a joint connection 60 as is shown in FIG. 1a.

In the case of a joint connection 60 as is shown in FIG. 1b, the position of the carriage 32 or of the joining component 10 can likewise be subject to position regulation while the metal section 18 is being heated. In this case, the value of the penetration 70 will be less, in particular less than the value of the deflection 86 while at the initial joining position.

If, in the present case, position regulation is carried out on the basis of an indirect zero point determination, it is self-evident that measurement tolerances should be taken into account. This is particularly true in the case of position regulation close to the zero point (for example, at the initial joining position).

Further embodiments of joining apparatuses and joining methods according to the invention will be described in the following text, which generally correspond to the joining apparatus in FIG. 1 and the joining method in FIG. 2, respectively. The same elements are therefore identified by the same reference numbers. Only the differences will be described in the following text.

Figure 3:
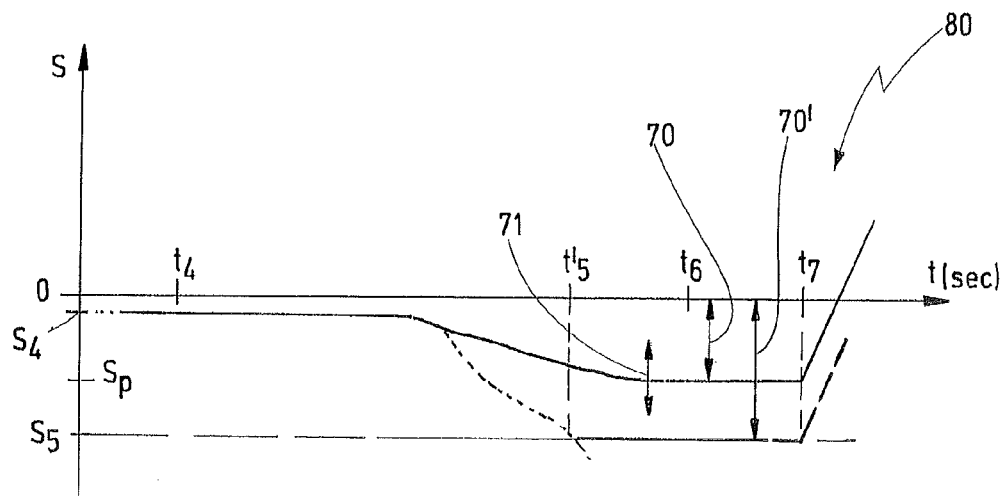
FIG. 3 shows a modification of the method shown in FIG. 2.

FIG. 3 shows a modified embodiment of the joining method 80 in which no position regulation at a specific penetration value is carried out after the time $t_4$. In fact, force regulation is carried out during the heating of the metal section 18, by means of which the force which is exerted by the joining component 10 on the workpiece 12 is regulated. This results in penetration 70, by the time $t_6$, which penetration 70 may be variable from one joining process to another, as is indicated by an arrow 71.

In this embodiment, when a maximum penetration 70' is reached (as indicated by a dashed line at the time $t_5'$ in FIG. 3), a changeover can be made to position regulation in order to avoid excessively deep penetration. In this case, the position is regulated at the maximum penetration 70', as is illustrated in FIG. 3.

Figure 4:
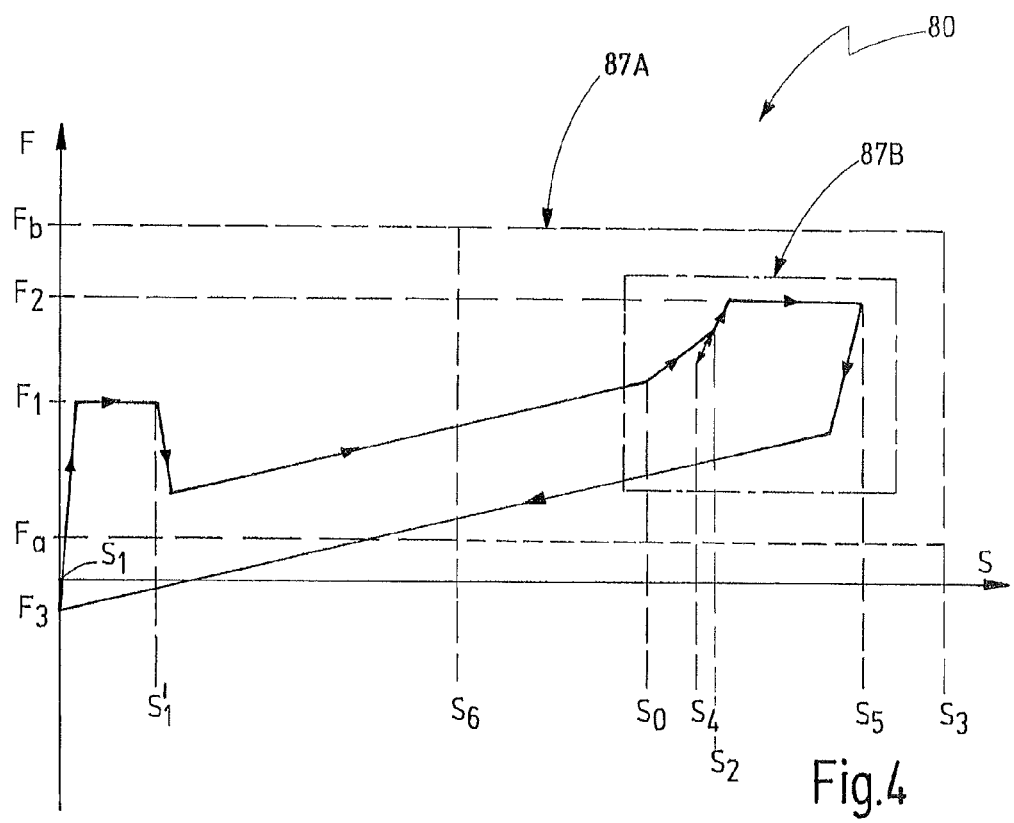
FIG. 4 shows an illustration of the force applied to a joining component, plotted against the position, in order to explain a joining method according to the invention.

FIG. 4 shows an illustration of the joining method 80 in the form of the force F applied by the joining component 10 to the workpiece 12, plotted against the position s of the carriage 32.

In this case, starting from the initial position $s_1$, a force $F_1$ is first of all exerted. The force $F_1$ overcomes the force $F_3$ of the spring 42, which keeps the carriage 32 pressed completely into the joining head housing 30 of the joining apparatus 8, and accelerates the carriage 32 in the direction of the workpiece 12 until the carriage 32 has reached a constant speed. As soon as the constant speed has been reached, position $S_1'$, the acceleration force is switched off and the only force component acting is that which is required to overcome the spring force and to maintain a constant speed of, for example, 300 mm/s.

At the position $S_0$, the joining component 10 touches the surface of the workpiece 12. The linear drive 34 increases its drive force in an attempt to maintain the constant speed of the carriage 32. However, the carriage 32 is braked with the workpiece 12 being deformed, and comes to rest at the position $S_2$. The position of the workpiece $S_0$ is identified by means of the distance sensor 53, and is known in this process phase. The joining component 10 is now moved to the position $S_4$ by reducing the drive force of the linear drive 34, and is held there until the time $t_4'$. At the time $t_4'$, the position regulation for the position $S_4$ is switched to force regulation in order to reach a position $S_5$. The position $S_5$ may fluctuate depending on the amount of inductive heating energy that is introduced. The force regulation results in a constant force $F_2$, which presses the joining component 10 further into the workpiece 12 and presses molten material out of the joint zone, even once the inductive heating has been switched off, until the resetting force of the bent workpiece 12 compensates for the constant force $F_2$. The joining component 10 is held in this position $S_5$ until the molten thermoplastic has completely solidified. The constant force $F_2$ is now reduced until the carriage 32 can move back at a constant speed to its rearward position in the joining apparatus 8.

FIG. 4 furthermore shows two process windows 87A and 87B. The process window 87A indicates the power limits of the linear drive, within which the joining process must be carried out. They are preferably defined by the length of the joining component 10. In this case, a position $S_6$ must be overshot in order to allow the carriage 32 to be pulled back again from the workpiece 12 after the joining process. The position $S_3$ indicates the maximum possible movement distance 12 of the carriage, which cannot be overshot during the joining process. These positions must be checked before the start of the process of switching on the inductive heating, in order to allow the joining process to be terminated, if overshot, before the inductive heating is switched on. $F_a$ and $F_b$ are the minimum and maximum forces which the linear drive 32 must provide in order to carry out the process.

The process window 87B shows the limits within which the actual joining process procedure must be carried out, in order to allow parameter monitoring to be carried out in a worthwhile form. Its parameter limits and tolerances must be defined individually for each joining position, and must be provided with their own identification number.

Figure 6:
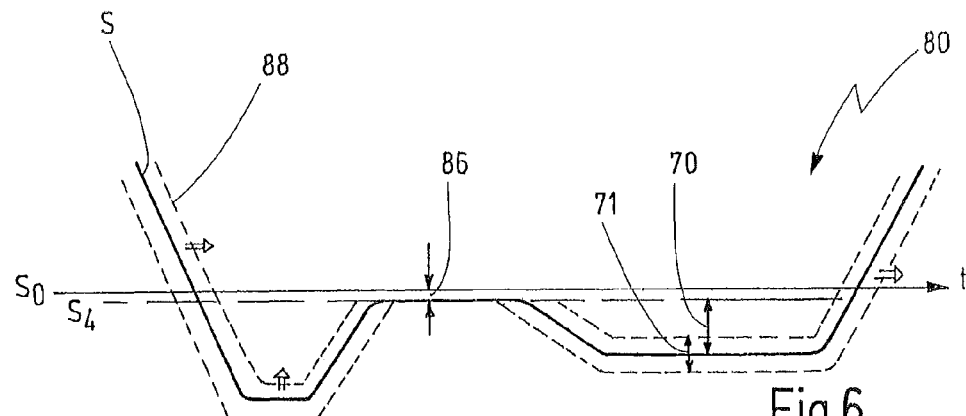
FIGS. 6 and 7 show illustrations of envelope curves for the profile of the position of the carriage, plotted against time, for determining suspicious joining processes.
Figure 7:
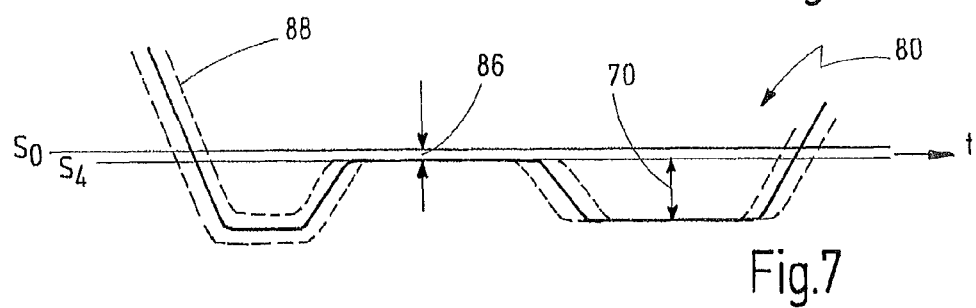

It is self-evident that the force/distance profile is preferably surrounded by tolerance bands, for example as in FIGS. 6 and 7. The steps of "place the joining component 10 on the workpiece 12" and "join the joining component 10 to the workpiece 12" can be monitored separately, with regard to reproducibility of the profiles. This makes it possible to derive measures for preventative maintenance.

Figure 5:
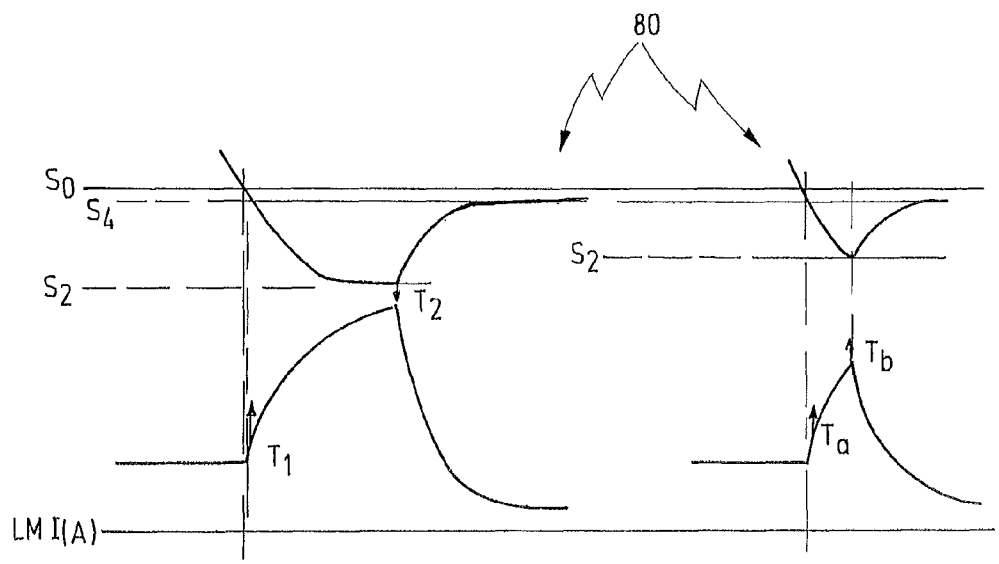
FIG. 5 shows illustrations of the position of a carriage of the joining tool plotted against time for determining the zero point.

FIG. 5 shows, in a detailed form, two methods for approximate determination of the position $S_0$ and for reliable determination of $S_4$ during the joining process. As can be seen here, the workpiece 12 is once again bent to a greater or lesser extent ($S_2$ and $S_2'$) about the joint zone.

In the case of the bend $S_2$, the event triggers $T_1$ and $T_2$ take place on the basis of the measurements of the current in the linear drive or the force (Trigger $T_1$) exerted by the linear drive on a force measurement box, and based on the measurement of the carriage movement (Trigger $T_2$) before and after the carriage has virtually become stationary. In the case of the bend $S_2'$, the event triggers $T_a$ and $T_b$ take place on the basis of the measurement of the current in the linear drive or the force exerted by the linear drive.

The trigger $T_1$ and $T_a$ result in the carriage position being measured directly. This corresponds to the desired position $S_4$ and approximately $S_0$, since $S_0$ must be overshot because of the abrupt rise in force and current. The triggers $T_2$ and $T_b$ lead to a reduction in the drive force of the carriage such that the carriage can be reliably moved to a position $S_4$ below $S_0$.

In both cases $S_0$ can be identified with sufficient accuracy, and the carriage can be reliably moved to a position $S_4$ slightly below $S_0$, at which the joining component 10 and the workpiece 12 are pressed against one another.

FIGS. 6 and 7 schematically illustrate the joining method as shown in FIG. 3 and FIG. 2 respectively, in which an envelope curve 88 is placed over specific sections of the profile of the movement s. This envelope curve 88 is defined in advance and represents acceptable movement profile tolerances. The movement is recorded during each joining process, and is then compared with the envelope curve 88. If there are any discrepancies (as indicated by the double-headed arrows in FIGS. 6 and 7), a suspicious joining process can be deduced, or a joining process which does not comply with specific Standards. Alternatively, a maintenance process can be initiated if there are a plurality of such discrepancies.

In this case, FIG. 6 shows the method from FIG. 3, with the penetration 70 being set, and to this extent being variable, by force regulation while the metal section 18 is being heated.

FIG. 7 shows the alternative of FIG. 2, in which position regulation is carried out while the metal section 18 is being heated. Thus, no envelope-curve tolerance is provided in this case with respect to the penetration 70.

Figure 8:
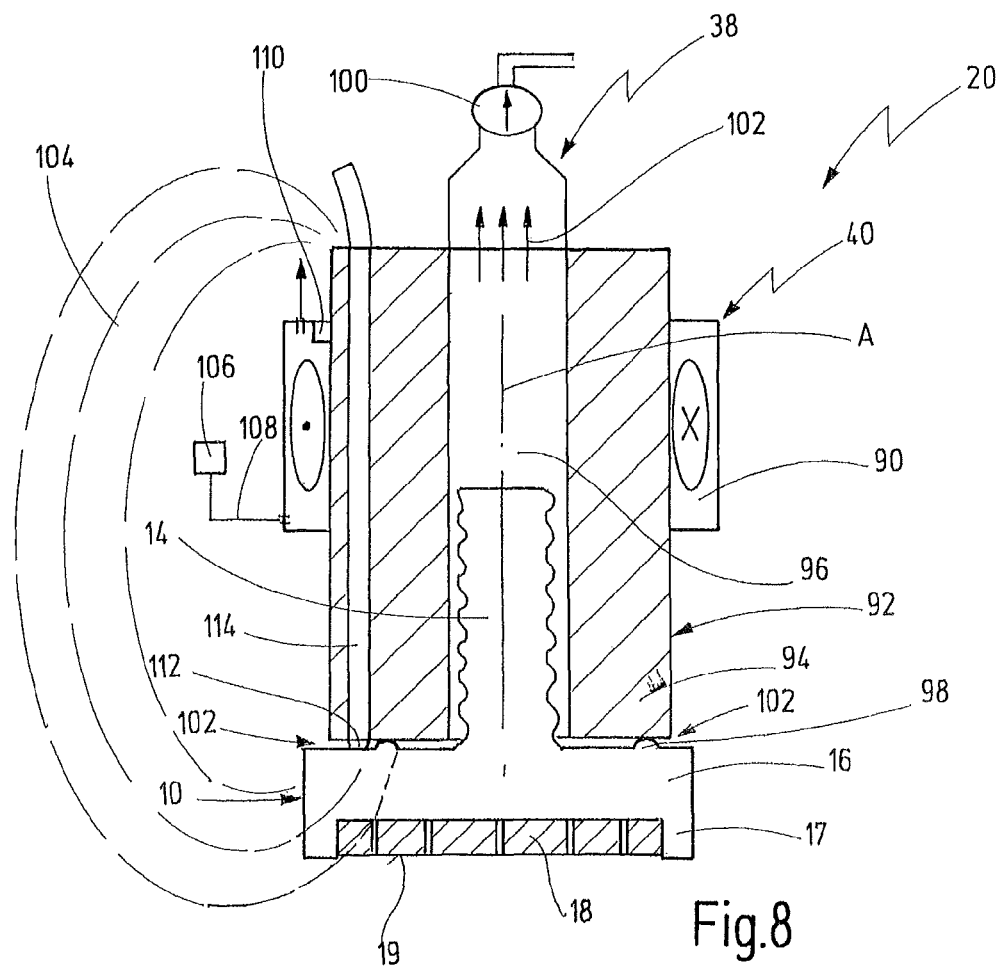
FIG. 8 shows a schematic longitudinal section view of a further embodiment of a joining tool according to the invention.

FIG. 8 shows an alternative embodiment of a joining tool 20. The joining tool 20 has an induction heating device 40 with a coil 90 and a ferrite core 92. The ferrite core 92 has a sleeve section 94, around whose external circumference the coil 90 is arranged. The sleeve section 94 is aligned concentrically with respect to a longitudinal axis A and has an axial through-opening 96. The through-opening 96 is designed to hold the holding section 14, which by way of example is in the form of a shank, of the joining component 10 such that a lower face of the sleeve section 94 is located adjacent to an upper face of the flange section 16.

One or more projections 98 is or are formed on the upper face of the flange section 16 and is or are designed to ensure there is a certain distance between the lower face of the sleeve section 94 and the upper face of the flange section 16. This makes it possible to ensure that the sleeve section 94 does not make contact with the upper face of the flange section 16 over an area but only essentially at points, thus making it possible to avoid adhesion of the sleeve section 94 when the flange section 16 is heated. The length of the projections 98 is the governing factor defining the magnetic field density in the metal part 18 and for this reason must be produced with tight tolerances. A holding device 38 in the form of a vacuum holding device 38 is provided on the upper face of the sleeve section 94. In this case, the upper side of the through-opening 96 is connected via an air channel to a vacuum pump 100 by means of which an air flow 102 can be produced from the lower face of the sleeve section 94 upwards. This allows the joining component 10 to be held on the sleeve section 94 by reduced pressure. Metallic components which could interfere with the production of the field by the induction heating device 40 are in this way avoided. Furthermore, the external diameter of the joining tool 8 can be kept considerably smaller. The field 104 produced by the induction coil 90 runs through the soft-magnetic ferrite core 92 and emerges from its lower face such that it enters the metal section 18, which can be heated inductively, through the flange section 16. From there, the field 104 emerges essentially in the radial direction and runs externally around the sleeve section 94, in order to close the magnetic circuit from its upper face.

The point marked 106 shows that a coil cooling device can be provided which is designed to pass an air flow 108 through the coil 90 or past the coil 90 in order if necessary to cool it when highly loaded. The air flow 108 can, if required, be derived from the outlet-air flow from the vacuum pump 100.

In order to identify whether the coil 90 must be cooled, a temperature sensor 110 may be provided on the coil 90. This is preferably arranged where the highest density of the lines of force of the field 104 is arranged with respect to the position of the coil, that is to say where there is a high probability that the coil 90 will be heated to the greatest extent.

Furthermore, a second temperature sensor is shown at 112, and is designed to measure the temperature of the upper face of the flange section 16. The second temperature sensor 112 can be set up by providing an axial sensor hole 114 in the sleeve section 94, through which sensor hole 114, for example, a glass-fibre line composed of non-magnetic material is drawn, in order not to influence the field. By way of example, the temperature may be measured by means of the thermal radiation emitted from the upper face of the flange section 16, or in a similar manner.

Figure 9:
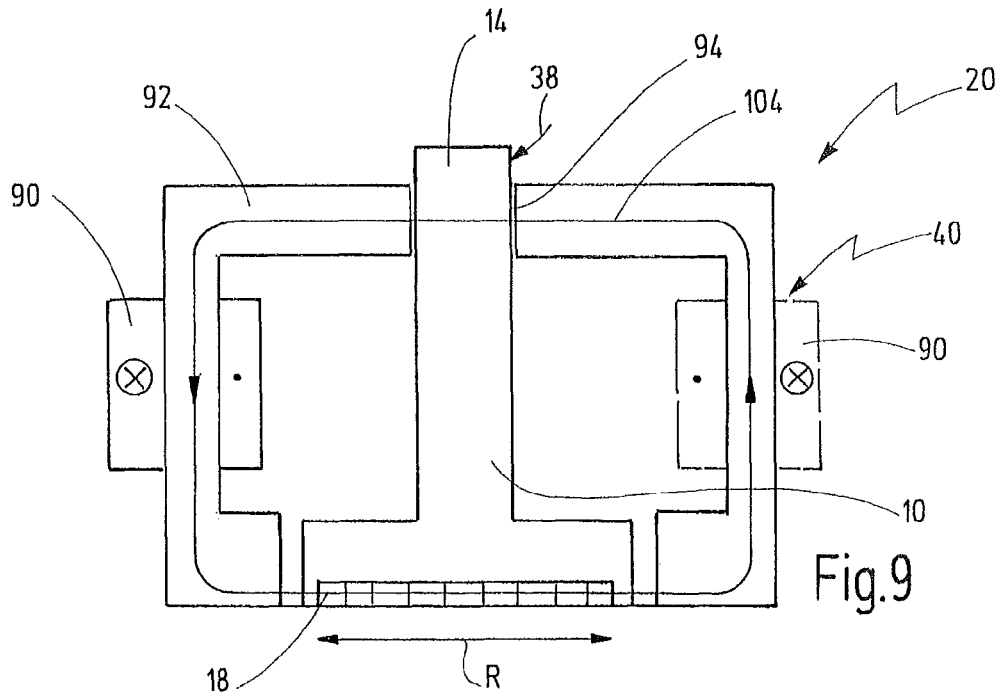
FIG. 9 shows a schematic longitudinal section view of a further embodiment of a joining tool according to the invention.

FIG. 9 shows a further alternative embodiment of a joining tool 20 with an induction heating device 40. In this embodiment, the ferrite core 92 is U-shaped, having an upper lateral limb which has an opening which forms a sleeve section 94 and through which the holding section 14 of the joining component 10 can project. A holding device 38, of a mechanical type also if required, can thus act on the holding section 14.

Furthermore, the ferrite core 92 has two longitudinal sections which extend parallel to the longitudinal axis, with a coil 90 being arranged around at least one of them.

FIG. 9 shows that a coil 90 can also be arranged around the second longitudinal section.

Finally, the ferrite core 92 may have two lower radial limbs which extend towards the external circumference of the flange section 16. In this case, a magnetic field 104 is passed through the ferrite core 92, enters the metal section 18 in the radial direction R and emerges therefrom on the opposite side.

Figure 10:
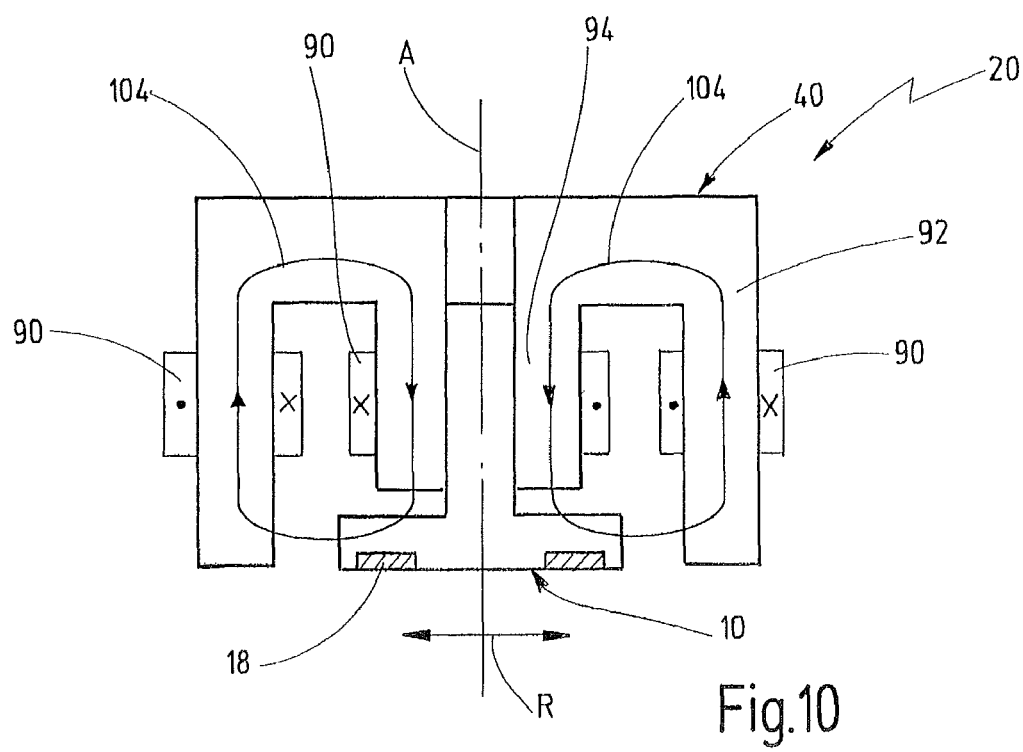
FIG. 10 shows a schematic longitudinal section view through a further embodiment of a joining tool according to the invention.

FIG. 10 shows a further embodiment of a joining tool 20 which has an induction heating device 40. The heating device 40 has an E-shaped ferrite core 92, with a central sleeve section 94 which may be similar to the sleeve section 94 of the heating device shown in FIG. 8. Two radial limbs are connected to its upper face and merge into two outer longitudinal sections. A coil 90 may in each case be arranged both around the sleeve section 94 and around the longitudinal sections of the E-shaped ferrite core 92. In this case two magnetic circuits are formed, and each produce a field 104. In this case, for example, as in the case of the embodiment shown in FIG. 8, each of the fields 104 enters the component 10 from above via the flange section 16, interacts with the metal section 18, and emerges in the radial direction from the joining component 10, in order in each case to enter the lower end of the outer longitudinal sections of the ferrite core 92.

Figure 11:
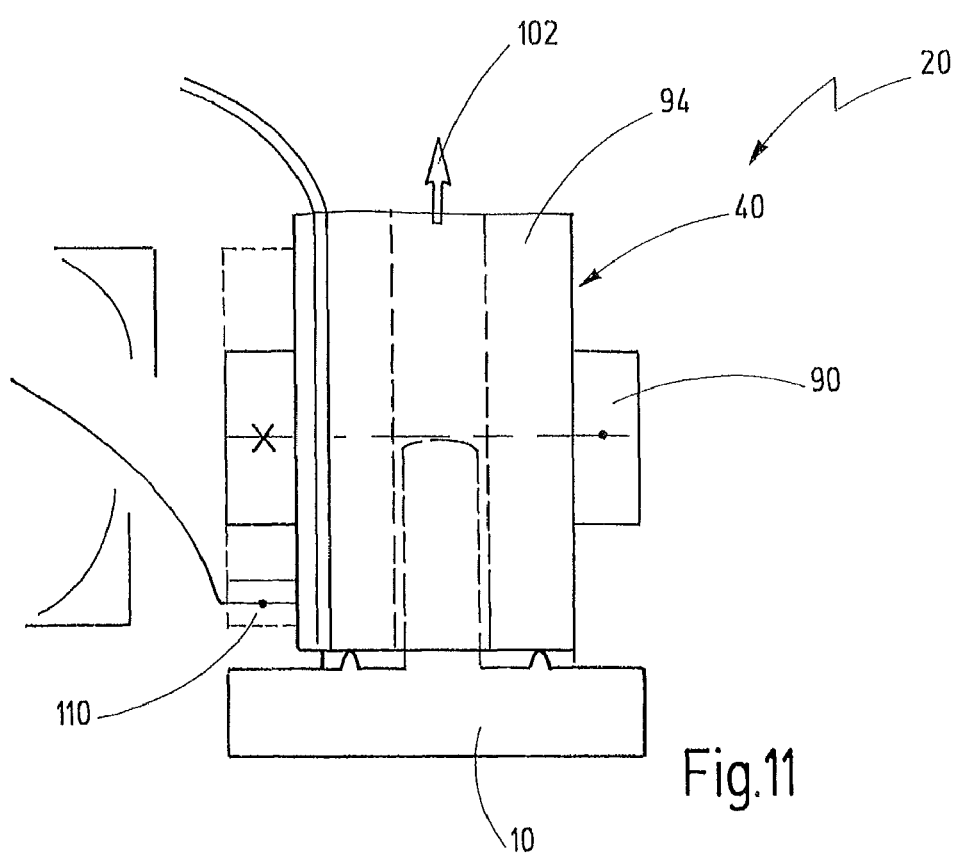
FIG. 11 shows a schematic side view of a further embodiment of a joining tool according to the invention.

FIG. 11 shows a further embodiment of a joining tool 20 with an induction heating device 40, in which case the general design corresponds to that shown in FIG. 8. The figure shows that the position of the coil 90 can be chosen to be variable in the axial direction. The figure also shows that the highest temperature u occurs in each case, because of the higher field density, at the axial end of the sleeve section 94 to which the coil 90 is closest. It is therefore generally preferable to arrange the coil 90 approximately centrally with respect to the longitudinal extent of the sleeve section 94. The figure also shows that the temperature sensor 110 for detection of the temperature of the coil 90 may, if required, also be arranged independently of the coil 90, to be precise in an area where the temperature is at its highest.

Figure 12:
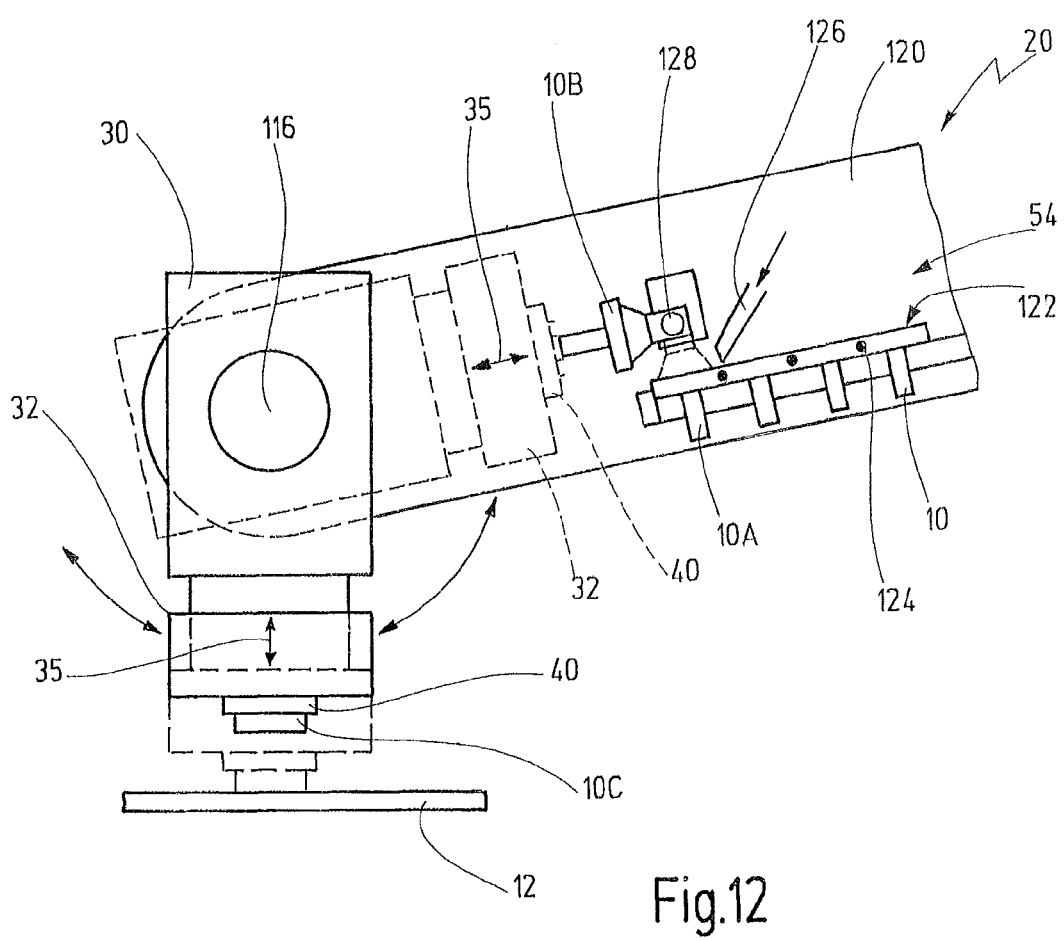
FIG. 12 shows a further embodiment of a joining tool according to the invention, in the form of a schematic side view.

FIG. 12 shows a further embodiment of a joining tool 20 which has an arm 120 on which a joining head 30 is arranged such that it can rotate about an axis 116, as is indicated by arrows in FIG. 12.

The arm 120 is designed to hold a number of joining components 10 which, for example, are mounted on the arm 120 in a magazine which is not shown in any more detail. The components 10 may be arranged in the magazine in the form of a component chain 122 connected to one another, with the individual joining components 10 being produced from a thermoplastic base body and being linked to one another via connecting webs 124 composed of the same material.

A schematically indicated separating device 126 is furthermore provided in the arm 120 and is designed to separate one component in each case from the component chain 122, in the illustrated case the component 10A.

A component 10A which has been separated in this way can then be transferred to a handover position by means of a handover device 128. FIG. 12 shows a component 10B in the handover position.

The joining head 30 can now be rotated such that, when the carriage 32 is operated, it can pick up the component 10B located in the handover position, as is illustrated by dashed lines in FIG. 12.

The component which has been picked up in this way can then be joined to the surface of a workpiece 12, as is illustrated for a component 10C in FIG. 12.

The elements in the component chain 122 can also be linked to one another on the holding sections 14, instead of being linked on the flange sections 16. Furthermore, the component chain 122 may also be placed in a magazine, in the form of a roll. In the latter case, it may be possible to dispense with a handover device 128 since the component chain 122 can be moved onwards by means of a movement device which is not illustrated, such that a front end of the component chain 122 is always located at the handover position.

The present invention can be embodied and modified in various ways, as described in the following text.

By of example, the joining component 10 may be in the form of a Xmas tree stud, having a flange section diameter in the range from 8 to 20 mm.

The holding section of the joining component may be in the form of a shank section with or without a thread, in order to attach plastic clips thereto, which carry out a function like that of the holder of a component (for example of a line). Alternatively, the holding section can also be designed such that it carries out this function itself.

The electric currents $i_L$ and $i_1$ in the above illustrations are each shown as average currents. In fact, they are in general alternating currents and, for example, can be clocked in a range from 5 kHz to 50 kHz.

Instead of introducing compressed air, the coil 90 can also be cooled by connecting the coil 90 to a reduced pressure, such that air is passed into the coil or past the coil 90.

By way of example, the projections 98 may be formed by three projections which are each designed to be in the range 0.2 mm to 0.5 mm, with an accuracy of less 0.05 mm, high and are offset through 120°.

In order to carry out the force regulation during the heating of the metal section 18, it may be advantageous to calculate the total force applied to the joining component 10 by subtracting the opposing force applied by the spring 42 from the force which is applied by the linear drive 34. If appropriate the gravitational force can also be added to or subtracted from this total force, depending on the orientation of the joining tool 20 in space. In this case, the total mass of the carriage 32 is taken into account, possibly also using trigonometric formulae if the angles are inclined.

For communication purposes, the connection between the control device 36 and the control unit 26 may be formed by a bus connection or by an RS485 communication line or the like.

If the intention is to join a plurality of joining components 10 to one another in series, the method according to the invention can in each case be carried out successively, with one new joining component 10 being transferred to the joining tool 20 between each process. This transfer can be carried out either from a stationary component supply station 54 or from a magazine which is provided on the joining tool 20. In the embodiment with a magazine on the joining tool 20, it may be necessary to replace a magazine after a specific number of joining processes, in which case a new magazine can once again be provided at a component supply station 54. When using a robot 22, the transfer can also be automated.

It is also feasible to replace the entire joining tool 20 when the magazine is replaced. In this case, a new joining tool 20 with a freshly filled magazine is picked up on the robot 22 and the joining tool with the empty magazine is removed, in order to fit this, for example, manually, with joining components 10.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A method of axially joining a hybrid joining component to a workpiece, wherein the joining component has a thermoplastic joining section and a metal section which can be heated, having the following steps:
   a) axially moving the joining component onto a surface of the workpiece;
   b) heating the metal section such that the joining section at least partially melts;
   c) ending the heating of the metal section so that the joining component makes an integral and interlocked connection with the surface of the workpiece;
   wherein the position of the joining component with respect to the workpiece is controlled at least during the heating of the metal section, in such a manner that the joining component can be joined to the surface of the workpiece without any opposing support, wherein the workpiece is elastically deformable in an axial direction (A), wherein the joining component is moved into contact with the surface of the workpiece before the metal section is heated, such that the workpiece is deformed in the axial direction, and wherein a zero point is determined before the joining component reaches the surface, in order to determine the axial position of the surface of the workpiece in the undeformed state.

2. A method according to claim 1, wherein the zero point ($s_0$) is determined by means of a distance sensor which is arranged on a joining tool on which the joining component is held during the joining method.

3. A method according to claim 1, wherein the relative position between the joining component and the workpiece is set by regulation to a target force, with which the joining component is pressed onto the workpiece, at least during a section of the heating of the metal section.

4. A method according to claim 3, wherein the relative position between the joining component and the workpiece set by regulation to the target force is converted to control by position when the relative position between the joining component and the workpiece reaches a preset maximum relative position.

5. A method according to claim 1, wherein the workpiece is produced from a thermoplastic material, and the metal section is heated such that the joining section of the joining component and a surface section of the workpiece are melted.

6. A method according to claim 1, wherein the joining component has a thermoplastic base body with a flange section in which the metal element is integrated, wherein the joining method is carried out such that the metal element is completely surrounded by thermoplastic material in the finished joint connection.

\* \* \* \* \*